United States Patent
VanNewenhizen et al.

(10) Patent No.: US 7,338,595 B2
(45) Date of Patent: Mar. 4, 2008

(54) FLOW-THROUGH TANK FOR WATER TREATMENT

(75) Inventors: John VanNewenhizen, Mundelein, IL (US); Gene Wayman, Fox River Grove, IL (US)

(73) Assignee: Culligan International Company, Rosemont, IL (US)

( * ) Notice: Subject to any disclaimer, the term of this patent is extended or adjusted under 35 U.S.C. 154(b) by 365 days.

(21) Appl. No.: 10/971,294

(22) Filed: Oct. 22, 2004

(65) Prior Publication Data

US 2005/0109703 A1    May 26, 2005

Related U.S. Application Data

(60) Provisional application No. 60/519,872, filed on Nov. 13, 2003.

(51) Int. Cl.
*B01D 35/027* (2006.01)
(52) U.S. Cl. ............... 210/96.2; 210/172.1; 210/195.2; 210/196; 210/197; 210/416.3; 210/434
(58) Field of Classification Search ............... 210/96.1, 210/96.2, 195.1, 195.2, 196, 197, 257, 416.3, 210/172.1, 194, 254, 257.1, 258, 434, 805, 210/900
See application file for complete search history.

(56) References Cited

U.S. PATENT DOCUMENTS

| 4,420,810 | A | | 12/1983 | Hernandez et al. | |
|---|---|---|---|---|---|
| 4,622,133 | A | * | 11/1986 | Furuno | 210/96.2 |
| 4,655,909 | A | * | 4/1987 | Furuno | 210/90 |
| 4,784,763 | A | * | 11/1988 | Hambleton et al. | 210/90 |
| 5,122,265 | A | | 6/1992 | Mora et al. | |
| 5,868,924 | A | * | 2/1999 | Nachtman et al. | 210/85 |
| 6,428,710 | B1 | | 8/2002 | Kempen et al. | |
| 2004/0123902 | A1 | | 7/2004 | Worczinski | |

FOREIGN PATENT DOCUMENTS

WO    WO 03/031034    4/2003

* cited by examiner

*Primary Examiner*—Matthew O. Savage
(74) *Attorney, Agent, or Firm*—Greer, Burns & Crain, Ltd.

(57) ABSTRACT

A fluid treatment system includes at least one flow-through tank, a treatment device configured for treating at least one of an untreated fluid and a treated fluid and providing the treated fluid to the at least one flow-through tank and at least one sensing device configured for sensing the quality of fluid in the at least one flow-through tank. The sensing device is connected to the treatment device for providing the treated fluid to the at least one flow-through tank upon a determination of a quality of fluids in the at least one flow-through tank being less than or equal to a predetermined fluid quality threshold.

10 Claims, 5 Drawing Sheets

FLOW-THROUGH TANK FOR WATER TREATMENT

RELATED APPLICATION

This application claims priority under 35 USC § 120 from U.S. Patent Application Ser. No. 60/519,872 filed Nov. 13, 2003.

BACKGROUND OF THE INVENTION

The present invention relates generally to fluid treatment devices such as water softeners or alternate contaminant reduction systems, and particularly to a flow-through tank water system for providing service water to points of use based upon both peak demands and daily usage in a domicile or a commercial application such as a food service establishment or other locations where water, particularly treated water is used.

Self-regenerating ion exchange water softeners (hereinafter referred to as "water softeners") are common water treatment devices used in domiciles and other facilities. Such water softeners have been preferred over alternative water treatment systems, primarily due to their low costs. However, such water softeners have potential environmental problems due to the high level of total dissolved solids (e.g., sodium or potassium chloride salts) discharged as waste during the regeneration process. Secondary uses of waste or reclaimed water, for example crop irrigation, can be impacted by high levels of these dissolved solids in the reclaimed water. As a result, reclaimed water is often regulated to limit such environmental impacts. Moreover, as the usage of reclaimed water increases, and as water supplies become more limited, it is anticipated that usage of water softeners will be more problematic as the quality of reclaimed water is subjected to stricter regulation.

As previously discussed, alternative water treatment systems capable of replacing a water softener and overcoming the problem of a high level of dissolved solids being discharged are known. However, such alternative water treatment systems are disadvantaged in that they are typically more expensive and complicated as compared to existing water softeners. This is particularly true when they are designed to meet a potential peak usage demand in a domicile. Peak usage is defined as when water treatment systems are designed to treat incoming raw water based upon all outlets or points of use in the domicile having water flow through them at the same instant. Conventional ion exchange water softeners can adjust to a wide range of flow rate demands and can be sized to meet peak demands. Such peak usage demands result in water treatment systems being designed to have water treatment capacity far exceeding the actual daily usage requirements of the domicile, and consequently increased costs of typical alternative systems relative to water softeners. By way of example, an alternative water treatment system that is sized to satisfy peak demands of a typical domicile can have a daily water treatment capacity that is 40 to 50 times greater than the domicile's actual daily usage requirements. A typical system designed to meet a 10 gallons per minute water demand would require 14,400 gallons per day capacity even if the actual daily usage is only 300 gallons per day. Consequently, a water treatment system designed to meet peak service water supply demands is generally much more expensive and complicated than a water treatment system that would merely satisfy daily service water usage requirements in the domicile.

One exemplary alternative water treatment system concept applied to address the above-identified problems is the use of an atmospheric storage tank and repressurization pump system. This system can achieve an on-demand instantaneous flow and includes a treatment device, which is installed on the incoming raw water supply that in turn, delivers conditioned water to the atmospheric storage tank. A pump/pressure tank system, commonly used in well water type systems, is then used to deliver service water on demand when a point of use is opened allowing water to flow to the point of use. Typically, the water treatment system is required to be sized to provide for at least daily water usage in the domicile over a twenty-four hour time period. In this manner, the on-demand service water usage requirements of the domicile are satisfied by using the treated water stored in the pressurized storage tank and a repressurization pump system. A repressurization pump of the system only operates when the storage tank pressure is reduced to a pre-set low pressure level. Thus, the repressurization pump is not required to operate every instant there is a demand for service water in the domicile, or to maintain a specific steady pressure in the pressurized storage tank.

Drawbacks of the atmospheric storage tank and delivery pump/pressure type water treatment systems include that they do not deliver service water at a constant pressure, must use an additional pump, require a level control, and they can completely run out of all water if the atmospheric storage tank or make-up/conditioning system is inadequate. An additional drawback is that these systems are exposed to the ambient air, which results in an additional air filtering apparatus being required to prevent contamination of the treated water.

Accordingly, there is a need for an improved water treatment system that can avoid the problems of known water treatment systems as well as alternatives to such systems by supplying the daily requirements of service water to a domicile in a more cost effective and less complicated manner. There is also a need for an improved water treatment system which meets periodic demands for treated water without requiring relatively high volume treatment capacity.

SUMMARY OF THE INVENTION

The present invention provides a fluid or water treatment system that provides service fluid or water according to both a periodic demand and a daily usage demand for service water in an installation or facility such as a domicile. The present invention provides several advantages over existing water softeners and other known alternative water treatment system designs. First, constant pressure is always provided at each of the points of use, such as faucets, shower heads, etc. Second, water is always available at these points of use. Even if service demand consumes all of the stored treated water, water (albeit untreated) will be available to all usage points. In addition, the present invention can be manufactured more economically in comparison to known alternative water treatment systems. Furthermore, the present water treatment system can include an add-on tank for the storage and delivery of higher quality water that may be desired for cooking and drinking, and operates with a relatively simple control panel or control system.

More specifically, a fluid treatment system includes at least one flow-through tank, a treatment device configured for treating at least one of an untreated fluid and a treated fluid and providing the treated fluid to the at least one flow-through tank and at least one sensing device configured for sensing the quality of fluid in the at least one flow-through tank. The sensing device is connected to the treatment device for providing the treated fluid to the at least one flow-through tank upon a determination of a quality of fluids in the at least one flow-through tank being less than or equal to a predetermined fluid quality threshold. The threshold can be varied depending on a desired water quality level of the water stored in the flow-through tank.

Water transferred to the treatment device is treated (softened, deionized, filtered or the like) and then can be directed to storage for points of use requiring high quality water, such as in kitchen faucets, and/or returned to the flow-though tank to improve the quality of the water in the flow-through tank. Advantageously, water in the flow-through tank maintains a constant pressure and is always ready on-demand for use. In addition, different quality levels of water can be delivered to the domicile. For example, the lower quality water of the treatment device can be used at points of use requiring lower quality water, such as toilets and higher quality water directed to points such as drinking water.

In an alternate embodiment, the present flow-through tank can be combined with an auxiliary untreated water tank. The latter tank is in fluid communication with the treatment device to receive the higher total dissolved solids (TDS) or other low quality water typically sent to drain as waste. The untreated water tank is placed in fluid communication with untreated use points in a domicile for more efficient use of the untreated water and a reduction of water being sent to drain. In one version, the untreated water tank is pressurized and connected to the treatment device so that when the untreated tank is filled, excess water will flow to drain. When demand in the domicile lowers the level in the tank, the system sends water to refill the untreated water tank, and water is no longer sent to drain.

In a further embodiment, a dual tank arrangement is provided, whereby the service water is delivered to usage points by one tank while the second tank is being refilled with treated water. In this way, all of the treated water in one of the flow-through tanks is usable before the tank is taken off line to be conditioned back to the desired endpoint in a "batch" rather than a continuous mode. A controller determines which tank is used for treated water. Once one tank has been completely refilled with treated water and the one in service delivered all the treated water it contained as signaled by a sensor in the outlet of that tank, the controller selects the filled treated tank.

In one version of this embodiment, a set of two 3-way solenoids controls the two tanks in and out of the service or treatment modes. One solenoid controls flow of service water out of a specified tank and a second directs the flow of treated water into the opposite tank. A three-way valve on the outlet of each tank provides a path to drain for wastewater during the refill stage. A multi position "spool" type valve or other multiport valve is contemplated as a substitute for the three-way valves. The selection of this embodiment needs to balance efficiency of water usage against the additional capital cost, complication of controls required and installation space.

DETAILED DESCRIPTION OF THE INVENTION

Figure 1:
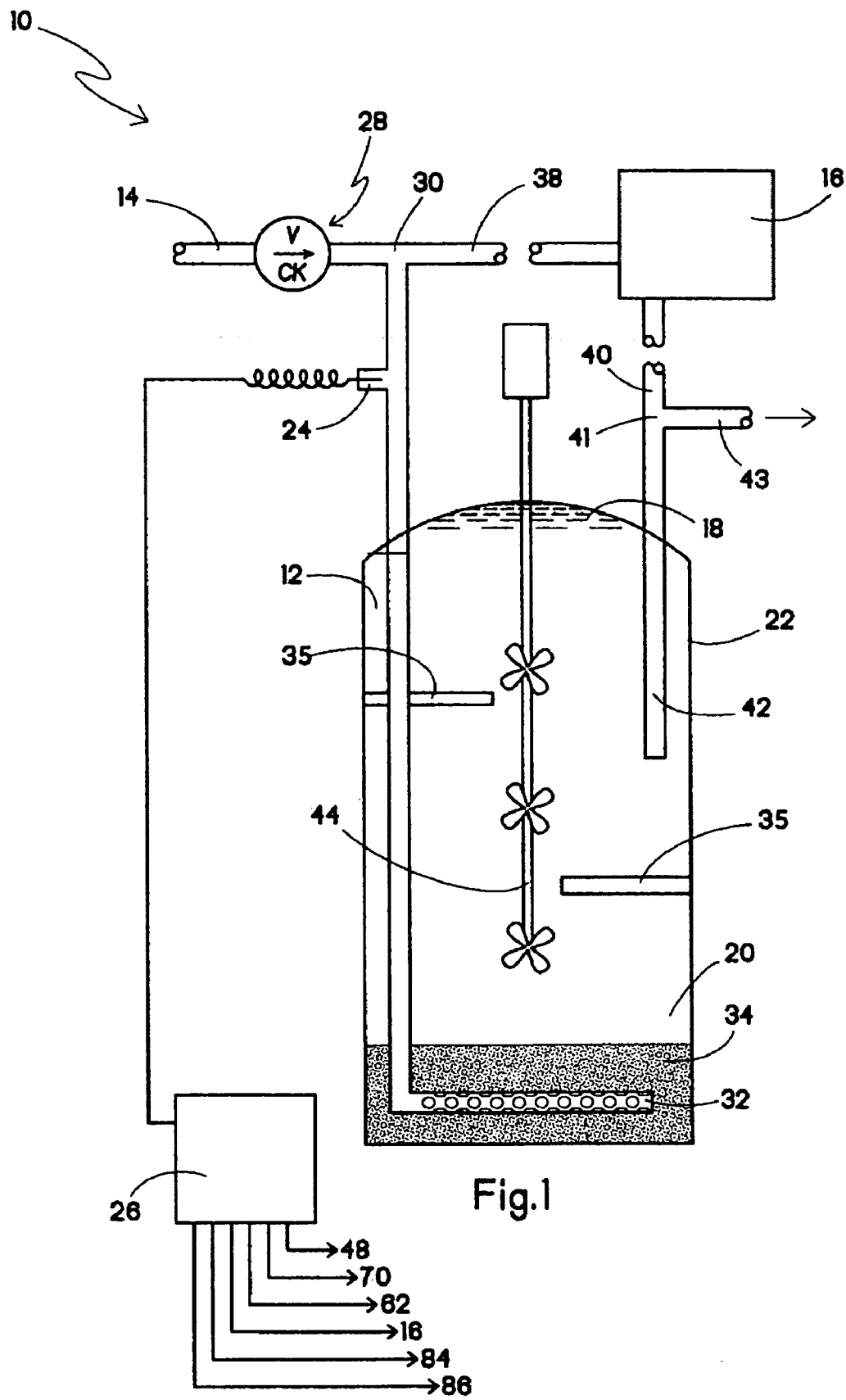
FIG. 1 is a schematic of a flow-through tank water treatment system constructed in accordance with the principles of the present invention.

Referring now to FIG. 1, the present fluid or water treatment system, generally designated 10, includes a flow-through tank 12. The present invention, including a treatment apparatus and method of operating same, offers several advantages over the prior art. First, full and constant inlet pressure is always provided at respective points of use (i.e., treated water delivery ports). Second, water is always available at the points of use. Moreover, the present treatment system 10 is smaller and more economical compared to known non-water softener water treatment systems and devices. In addition, the present system 10 can be adapted to include an add-on storage tank for generating higher quality water, and operates with relatively simple controls.

The present flow-through tank 12 receives raw, untreated or low quality water by a line 14 that is under inlet water pressure, similar to a typical residential hot water heater. Generally, water quality is determined by a the amount of contaminants in a treated service water supply, expressed in units of parts per million (ppm), and can vary depending on the use of serviceable water. By way of example, a service water supply for a residential toilet (i.e., point of use) may have a different water quality requirement than service water provided to a drinking water faucet (i.e., point of use).

A side-stream treatment device 16 causes water 18 in the tank 12 to be removed from a bottom 20 of the tank, treated, and then returned to a top 22 of the tank. In the present invention, the treatment device 16 is contemplated as being a small softener, a reverse osmosis (RO) system, a nanofiltration system, an activated carbon filter, a deionizer, or other chemical, or other type of known TDS reduction water treatment technologies. As the water 18 continues to be treated, the entire contents of the tank 12 are eventually treated to a desired or selected water quality level and the side-stream treatment device 16 is turned off to discontinue treatment of the water. Next, if there is a demand for service water at some point of use (not shown) or outlet port of the system 10, then the inlet pressure at the bottom 20 of the tank 12 causes the treated water in the tank to be provided as service water at the point of use.

A water quality sensor 24 at least partially positioned within or associated to be in fluid communication with the tank 12 determines whether the quality of the water 18 in the flow-through tank 12 is below a predetermined water quality threshold, and provides a signal to a control panel 26. The control panel 26 operates, among other things, the side-stream treatment device 16 and reactivates the device, causing treatment of the water 18 in the tank 12 until a selected water quality level is again detected by the sensor 24. It is anticipated that a water quality sensor or sensors could be used at multiple locations in the tank 12 or the water system 10 to signal information to the control panel 26.

As illustrated in FIG. 1, raw inlet water enters in the line 14 and is fed through a check valve 28. The water then enters the flow-through tank 12 via a T-intersection 30 or equivalent passageway and passes through a lower distribution port 32 and a gravel underbedding 34, creating an even delivery of the water 18 into the bottom 20 of the tank. It will be seen that the distribution port 32 is slotted, drilled or screened and in combination with the gravel underbedding 34, results in a desired even, upward "plug-like" flow. Ideally, the "plug-like" flow is subject to minimal mixing of the water 18 in the tank 12. Alternate lower distribution systems that enhance this "plug-like" flow upward through the tank are contemplated, such as in-tank baffles 35. The water quality sensor 24 monitors the quality of the water 18. If the sensor 24 determines that the quality of the water 18 in the tank 12 is below a predetermined water quality level threshold, the control panel 26 receives a turn-on signal from the sensor 24 to turn on the side-stream treatment device 16. At that time, water will be fed to the device 16 through the line 38.

The treated water 18 is then fed back to the tank 12 via a line 40, passes through a T-intersection 41 or equivalent fitting as pressurized water due to the treatment process, and is returned to the top 22 of the tank via a line 42. Upon the sensor 24 determining that the quality of the water 18 is at or above the predetermined water quality threshold, the turn-on signal to the control panel 26 is discontinued and the side-stream treatment device 16 is turned off by the control panel. As a result, the flow of water 18 through the line 38 is discontinued. If the water 18 is required at one or more points of use (not shown), which are fed by a line 43 which connects to the T-intersection 41, then the raw water entering the tank 12 via the lower distribution port 32 and through the gravel underbedding 34 pushes the water out of the tank and into the lines 42 and 43 which deliver water to the points of use. Optionally, a mixer 44 may also be positioned in the tank 12 to mix the water 18, and can be controlled by the control panel 26. It is contemplated that the mixer 44 may be powered or static, or cause agitation of the tank 12 or the contents, or other known mixing system.

The side-stream treatment device 16, operating with the flow-through tank 12 can be designed using a number of technologies that condition, treat, or provide water softening or TDS reduction to a fluid. For example, some technologies include membrane-based technologies such as RO or nanofiltration, which reduce the level of TDS present in the water 18. A suitable treatment system incorporating a combination of nanofilters and RO units is disclosed in U.S. Pat. No. 6,645,383, which is incorporated by reference. These latter technologies use a pressure differential across a semi-permeable membrane to create a stream of reduced TDS water and a stream of concentrated TDS water, and operate well in conjunction with the present flow-through tank water treatment system 10. Less desirable or higher concentrated TDS water can be discarded to a drain, and pressurized lower concentrated TDS water can be returned to the flow-through tank 18 since the lower concentrated water can overcome the water pressure in the tank.

Figure 2:
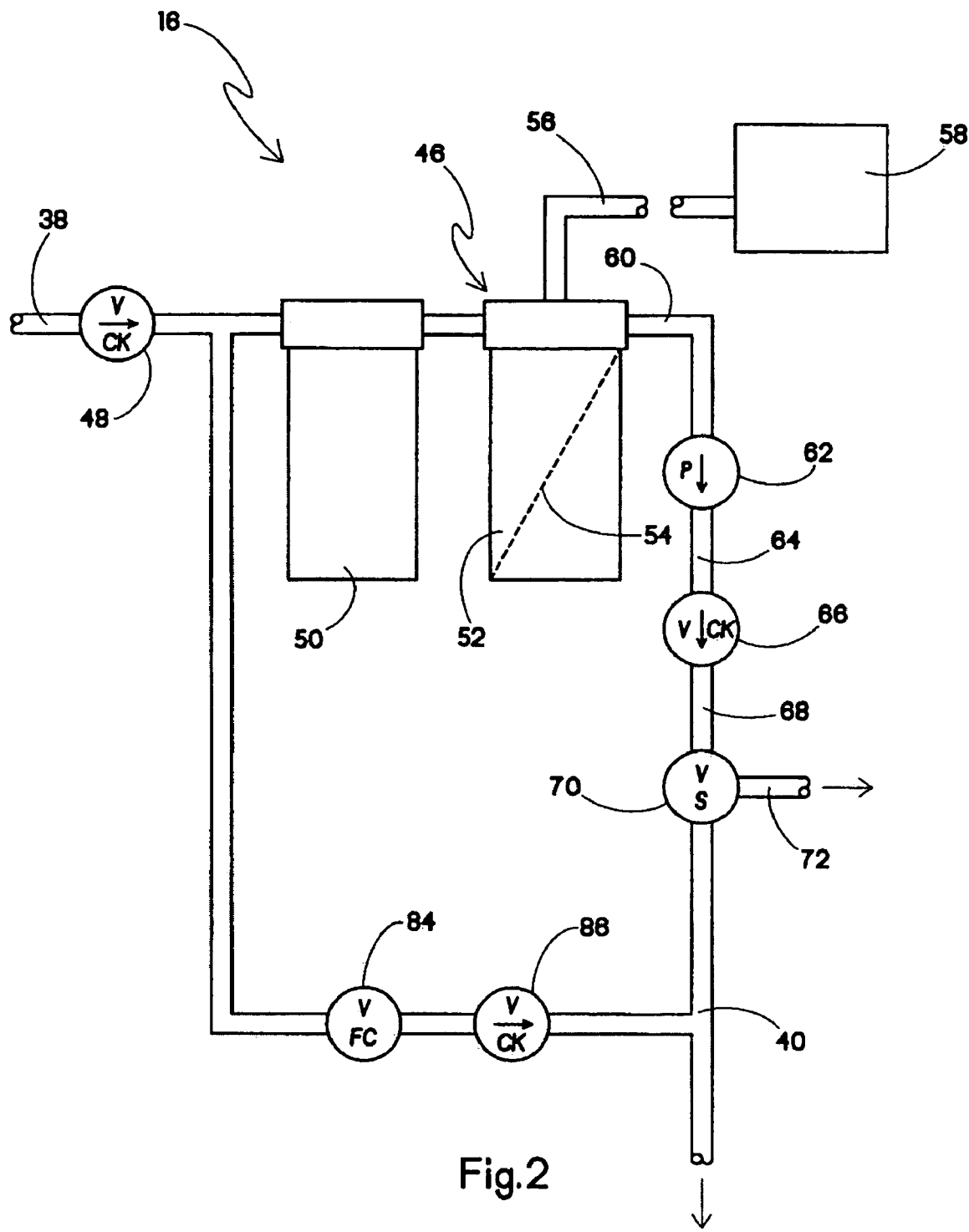
FIG. 2 is a schematic of a reverse osmosis water treatment system suitable for use with the treatment system of FIG. 1.

FIG. 2 illustrates a treatment device 16 that is an exemplary reverse osmosis (RO) system, generally designated as 46, which is operable with the present flow-through tank 12 of FIG. 1. When the water quality sensor 24 (see FIG. 1) measures the water quality level below a predetermined water quality threshold, then the water 18 is fed through the line 38 to the RO system 46. The water 18 then passes through an open inlet solenoid valve 48 which is controlled by the control panel 26. Optionally, a prefilter 50 can be included to protect the RO system 46 from any contaminant particles that may be present in the water 18. The water 18 next enters a pressure vessel 52 having an internal RO membrane 54 (shown hidden). The water 18 is passed through the membrane 54 and separated into a high quality product water, and a low quality concentrated water supply that passes through a line 56 that feeds into a drain 58.

A line 60 feeds low TDS product water (i.e., higher quality water) to a pressure pump 62 which is controlled by the control panel 26. Although a pump to create a pressure differential in a RO system is typically employed on a feed side of the membrane 54, it is preferred to position the present pump 62 so that low TDS product water is pumped after passing through the membrane 54. Such positioning of the pump 62 is advantageous because a smaller pump may be used. In addition, the pump 62 provides a reliable pressure boost for the low TDS product water passing through the line 40 to return the water to the flow-through tank 12.

Pressurized product water from the pump 62 passes through a line 64 to a check valve 66 and then through a line 68 and into a three-way solenoid valve 70 that is also controlled by the control panel 26. Low TDS product water is then either directed to the drain 58 via a line 72 or flows through the solenoid valve 70 and the line 40 and is returned to the flow-through tank 12. The control panel 26 of FIG. 1, upon receiving a turn-on signal from the sensor 24, energizes the solenoid valves 48 and 70 and the pump 62 to turn on the RO system 46 and generate the low TDS product water. When the sensor 24 determines that the water quality level is at or above the predetermined threshold, the control panel 26 no longer receives the turn-on signal and causes the solenoid valves 48 and 70, and the pump 62, to be de-energized. Consequently, the treating of the water 18 is discontinued and the outlet three-way solenoid valve 70 opens to the drain 58, which relieves any backpressure on the RO membrane 54. It is contemplated that the valving and arrangement of conduits may vary to suit the application provided the basic flow patterns described above are maintained.

The product water received from the treatment device 16 is of the highest quality. This high quality water, in the case of a RO system, is desirable for drinking and cooking purposes. In fact, many domiciles today operate with a small under-the-sink RO system with a separate tap for such drinking and cooking use. By taking and storing a portion of the treated water directly from treatment device 16 of the water treatment system 10 before it is returned to the top 22 of the tank 12 and mixed with the lower quality water 18, the present treatment system 10 provides an advantage over existing water treatment systems in that a source of this high quality water is achieved without the need to have an additional water treatment system in the domicile.

Figure 3:
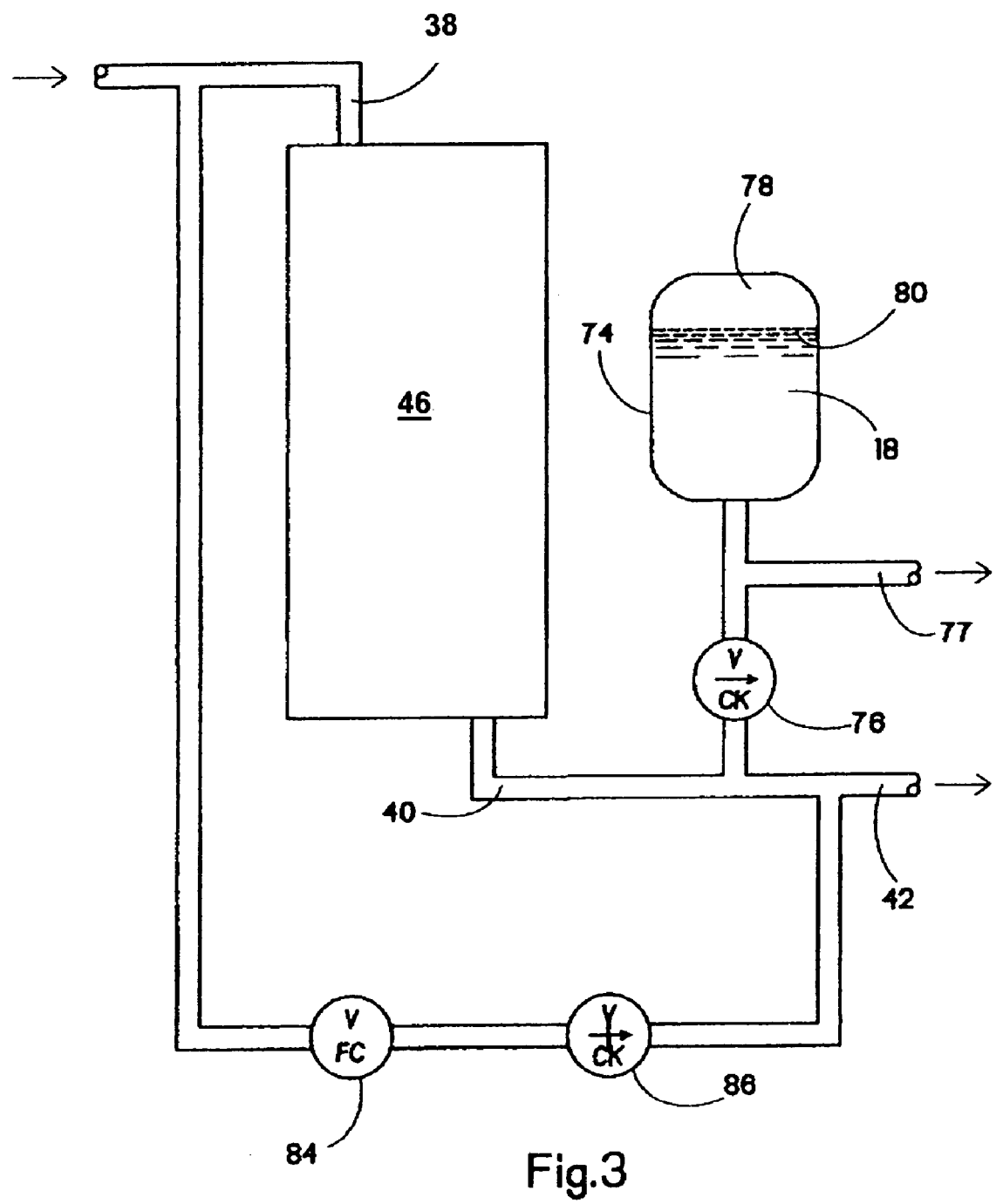
FIG. 3 is a schematic of the reverse osmosis water treatment system of FIG. 2 having an optional captive pressurized storage tank.

Referring now to FIG. 3, an optional optimal captive air-pressurized storage tank 74 for storing treated water in the RO system 46 of FIG. 2 is shown. Pressurized treated water from the treatment system 46 overcomes check valve 76 and flows into the storage tank 74 until the push back pressure in the storage tank equals that of the pressurized treated water in the line 40. The storage tank 74 is typical of those used on most under-the-sink RO drinking water systems. When there is a demand (e.g. an open faucet) at a point of use requiring high quality water from a line 77, compressed air 78 in the storage tank 74 pushes on a flexible barrier or bladder 80 that is also positioned in the storage tank. This bladder 80 separates the compressed air 78 from the water 18 and results in the treated water being delivered under pressure to the "faucet open" point of use. If the pressure in the storage tank 74 is less than the pressure of the water in the line 40, then the treated water again fills the storage tank until these respective pressures are equal. Treated water can also pass through the line 42 to the top 22 of the flow-through tank 12.

In other water treatment applications, such as food service establishments, there may be a need for water that is treated to a lesser degree than a treatment system such as reverse osmosis is capable of producing, yet better than that of the raw water from the reservoir 14. For example, the taste of fountain soft drinks and coffee are often considered better when the TDS level of the water used to make them is between 50 and 100 ppm. An advantage of the present flow-through tank 12 is that it allows the level of water treatment to be set to different desired levels, regardless of the level of the TDS encountered in a raw water supply. Besides the optional mixer 44, it is also anticipated that mixing could be achieved through the use of mechanical devices, recirculation flows, or other such methods. Mixing and/or blending incoming treated water with the higher TDS influent water already in the flow-through tank 12 under the control of the control panel 26 is usable to effectively select the mineral content of the service water.

This embodiment enables food service or other such operations to rapidly and easily select a desired level of water treatment without requiring complex blending of treated and raw water. In addition, an advantage of this mode of operation is that no adjustments to the system 10 are required when the incoming TDS level of raw water changes over time.

Adjustments of water quality can also be made through more traditional blending methods. A bypass of the treatment device using a bypass control valve 84 and a check valve 86 (see FIG. 2) which is connected to the control panel 26, and is in fluid communication with the treatment device 16 and the tank 12 whereby the proportion of treated and by-passed (influent) water can be changed to allow for onsite adjustment as needed, thereby filling the flow-through tank 12 directly with water of a specific quality without the use of an auxiliary mixing device.

Figure 4:
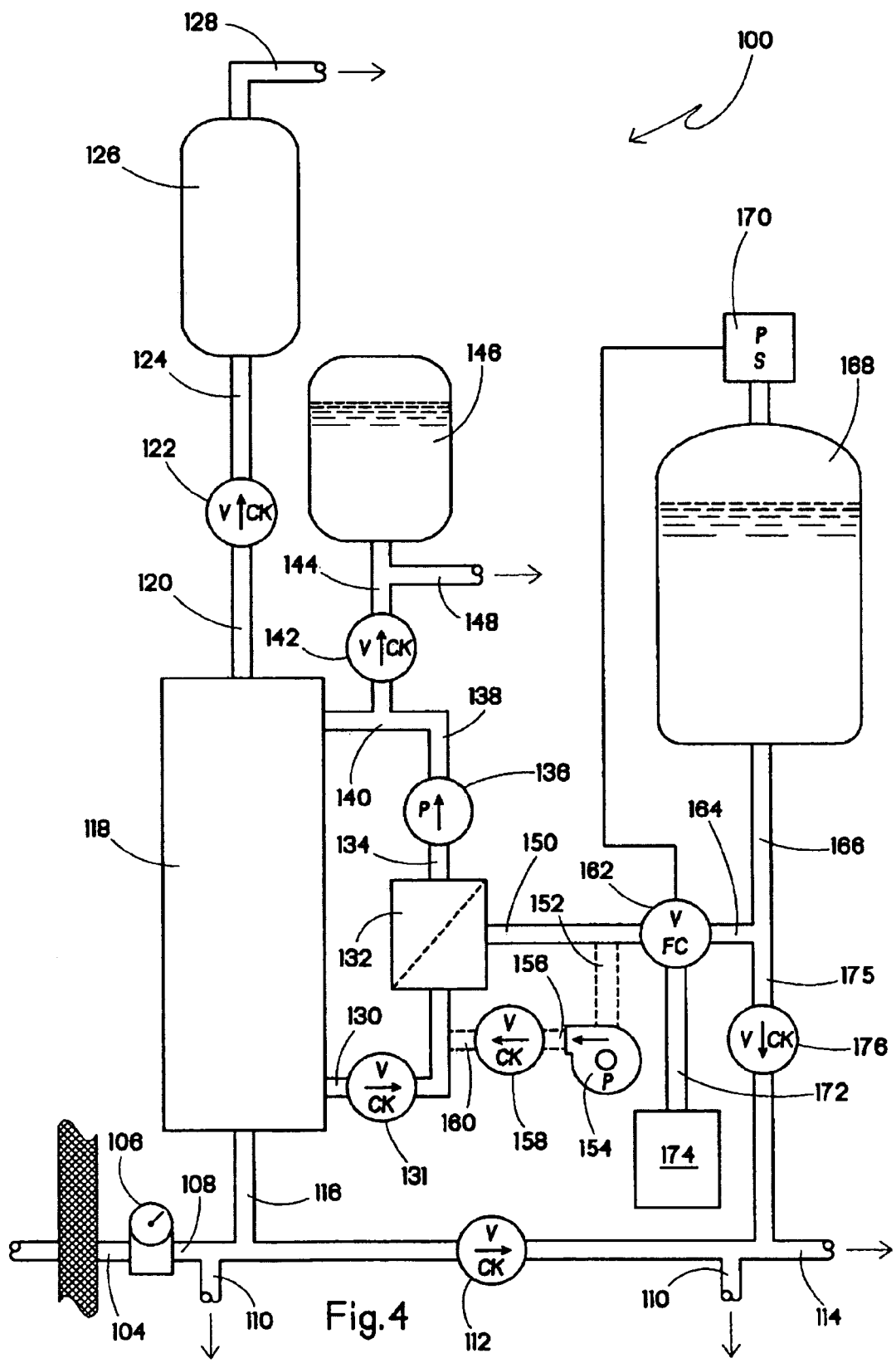
FIG. 4 is a schematic of a water treatment system for achieving a zero or near zero discharge process for a domicile.

When the present system 10 employs a technology such as reverse osmosis that effectively separates the incoming water into treated and discharge streams without the addition of other chemicals, the present flow-through tank 12 also creates the possibility of using all the incoming water to achieve a zero (or near zero) discharge process for a domicile. Referring now to FIG. 4, the treated water 18 from the flow-through tank system could be used for only hot water and drinking water service needs. The higher TDS concentrated water normally discharged to the drain 58 could be captured by another pressurized storage tank and delivered to other points of use (i.e. flushing toilets) that do not require treated or high quality water.

As illustrated in FIG. 4, such an increased water re-use system, generally designated 100, receives raw water from a main through a line 104 to a meter 106 that measures the amount of water passing through the line 104. The water passing through the meter 106 is fed to a line 108 which can include one or more outside taps 110 that further distribute raw or low quality water. A check valve 112 is provided to control water flow to a line 114 that feeds to untreated points of use (not shown). A line 116 connects to the line 108 and feeds a flow-through tank 118, which is similar to the tank 12, the above discussion of which is applicable here. The water from the flow-through tank 118 can be fed into a line 120 and through a check valve 122 to a line 124 which connects to a hot water tank 126. A line 128 feeds water from the hot water tank 126 to hot treated water points of use (not shown). The water in the flow-through tank 118 can also pass through a line 130, through a check valve 131 and feed into a water treatment device 132. As was the case with the system 10, the treatment device 132 is similar to the treatment device 16. Low TDS treated water can pass through the line 134 and be pressurized by a pump 136 and then be fed via a line 138 to the flow-through tank 118 via a T-intersection 140. A check valve 142 connects to the T-intersection 140 and enables treated water to flow via a line 144 to a pressurized high quality water storage tank 146 like the tank 74, and also be fed via a line 148 to high water quality points of use (not shown). Lower quality high TDS water (typically sent to drain 58) produced by the treatment system 132 passes through a line 150 and can optionally be re-treated by passing through a line 152, a recirculation pump 154, a line 156, a check valve 158, and a line 160 which feeds into the line 130. This optional subsystem increases the recovery rate of the treatment system 132.

The low quality high TDS water may also feed via the line 150 to a solenoid or other control valve 162, connecting via lines 164 and 166 to an untreated water storage tank 168. Connected to a pressure switch 170, the valve 162 is in fluid contact with the untreated water storage tank 168 for measuring pressure in the storage tank 168, and allows for discharge of the low quality high TDS water via a line 172 to a drain 174 when the tank 168 is filled. The low quality high TDS water can also pass through a line 175 connected to the line 164 to feed into the line 114 for use with the outside tap 110 or to feed into an untreated point of use (not shown). As water is drawn from points 110 or 114, the water level in the tank 168 decreases and the pressure switch 170 signals the valve 162 to direct more water into the tank 168 rather than to the drain 174. A check valve 176 prevents the water that flows through the check valve 112 from entering the untreated water storage tank 168. As is the case with the system 10, in the system 100, the valve 162, the meter 106, the pressure switch 170 and other controllable components are connected to the control panel 26.

Figure 5:
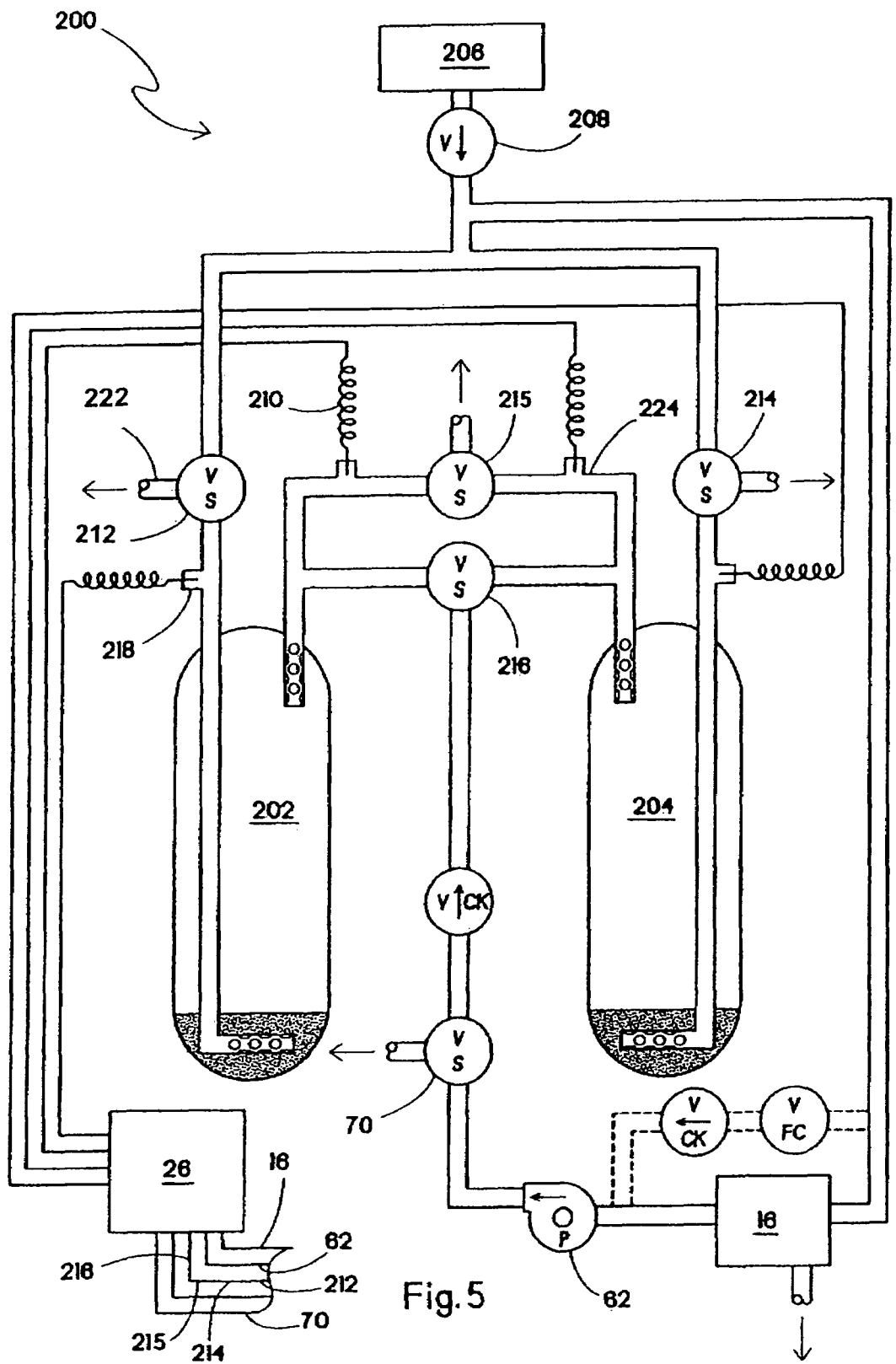
FIG. 5 is a schematic of a dual tank water treatment system operable in a batch type mode, alternating the tank in the service position.

Referring now to FIG. 5, a dual tank embodiment of this invention is generally designated 200. Components which are similar or identical to components of this system 10 have been designated with identical reference numbers. In this embodiment, service water is delivered to usage points by a first tank 202 while a second tank 204 is being refilled with treated water. Raw or untreated water is directed under line pressure through a line 206 to flow through the tanks, 202 or 204, depending on which tank is being controlled by a solenoid valve 215 to deliver service water. During the time that the first flow through tank 202 is delivering service water, a sensor 210 is constantly monitoring the quality. When the sensor 210 determines that the quality of water being delivered from the tank 202 is below a predetermined quality, it provides a signal to the control panel 26. The control panel 26 operates, among other things, the treatment device 16 as previously described in FIGS. 1 and 2, and valves 212, 214, 215 and 216, which are preferably solenoid operated valves however other types of controllable valves are contemplated. The valves 212, 214, 215 and 216, the associated sensors 210 and 224 and the control panel 26 form a selection mechanism.

It can be seen that valves 215 and 216 operate together in a switching type of mode. That is, when the valve 215 places the tank 204 in the service position; the valve 216 places the opposite tank, 202, in the refill-with-treated-water position. Valves 212 and 214 only operate when the treatment device 16 is working to refill each respective tank. After the control panel 26 receives the low quality signal from the sensor 210, it reverses the valves 215 and 216 to place the tank 204 in the service position and the tank 202 in the refill position.

Next, the control panel 26 turns on the treatment device 16. The treatment device 16 will then continue to run, receiving inlet water from the line 206 and monitoring quality at the sensor 218 as the water being pushed out of the tank 202 is sent to drain at 222 through the activated valve 212. Once the control panel 26 has determined that the water quality at the sensor 218 has reached the desired level, it will turn off the treatment device 16 and the valve 212. Flow into the tank 202, now filled with treated water, will cease and the tank will remain in this stand-by position until the quality of water being delivered by the tank 204 and monitored by a sensor 224, also part of the selection mechanism, is determined to be below the desired level. At that time, the tanks 202 and 204 will reverse modes as described above, and the tank 202 will begin delivering service water and the tank 204 will go into the refill mode.

It is also contemplated that the flow-through tank 12 is adjustable in a variety of ways to most efficiently operate in a particular application. Factors that influence efficiency include space for installation of a water treatment system, the quality of water required, and the expected peak demand and daily water usage rates of the user. Flow-through tanks of different sizes and shapes could be selected without negatively impacting the system concept. Different treatment technologies are also contemplated based on cost, effectiveness, and availability. Moreover, the size of such treatment systems may vary to suit the application.

While a particular embodiment of the present flow-through tank for water treatment has been described herein, it will be appreciated by those skilled in the art that changes and modifications may be made thereto without departing from the invention in its broader aspects and as set forth in the following claims.

What is claimed:

1. A fluid treatment system comprising:
   at least one non-treating flow-through tank for temporarily retaining a supply of fluid for subsequent use by the system;
   an inlet line leading to a first intersection;
   a first line leading from said first intersection to an interior of said tank;
   a second line leading from said first intersection to a side-stream treatment device configured for treating at least one of an untreated fluid from said inlet line and a treated fluid from said tank via said first line and selectively providing the treated fluid to said at least one flow-through tank;
   a third line leading from said treatment device to an interior of said tank for delivering said treated fluid to the interior of said tank;
   an outlet line connected to the interior of the tank for delivering water to a point of use; and
   at least one sensing device configured for sensing the quality of fluid in said at least one flow-through tank and being connected to said side-stream treatment device for providing the treated fluid to said at least one flow-through tank upon a determination of a quality of fluids in said at least one flow-through tank being less than or equal to a predetermined fluid quality threshold.

2. The fluid treatment system of claim 1, wherein said inlet line distributes fluid through said flow-through tank in a plug-like flow manner.

3. The fluid treatment system of claim 2, wherein said inlet line includes a slotted, drilled or screened end configured for feeding untreated fluid to said at least one flow-through tank.

4. The fluid treatment system of claim 2, wherein said at least one flow-through tank has gravel in a bottom of said at least one flow-through tank to facilitate distribution of said untreated fluid fed through said inlet line in said plug-like flow manner.

5. The fluid treatment system of claim 1, further comprising a mixer configured for mixing said untreated and treated fluids in said at least one flow-through tank.

6. The fluid treatment system of claim 1, further including at least one baffle in said at least one flow-through tank.

7. The fluid treatment system of claim 1, further comprising a control panel configured for receiving a turn-on signal from said at least one sensor and turning on said treatment device to provide the treated fluid to said at least one flow-through tank.

8. The fluid treatment system of claim 1 further including a bypass valve in fluid communication with said treatment device and said at least one tank and configured for blending fluid from said treatment device with incoming untreated fluid into said at least one tank.

9. The fluid treatment system of claim 1, wherein said treatment device includes a reverse osmosis system comprising:
   a pressure vessel having a reverse osmosis membrane;
   a drain line connected to said pressure vessel and configured for draining filtered fluid having a lower quality than said predetermined threshold;
   a product fluid line connected to said pressure vessel and configured for receiving treated fluid having a higher quality than said predetermined threshold and delivering the treated fluid to the third line; and
   a pump fluidly connected to said pressure vessel and configured to pump said treated fluid to said third line.

10. The fluid treatment system of claim 9, wherein said pump is provided in said product fluid line at a downstream side of said reverse osmosis membrane.

* * * * *